United States Patent [19]

Otis et al.

[11] 4,216,263

[45] Aug. 5, 1980

[54] MAGNET WIRE

[75] Inventors: Harold R. Otis; Charles E. Blake, both of Fort Wayne, Ind.; Paul J. Schmidt, Payne, Ohio

[73] Assignee: Rea Magnet Wire Co., Inc., Fort Wayne, Ind.

[21] Appl. No.: 36,084

[22] Filed: May 4, 1979

Related U.S. Application Data

[63] Continuation of Ser. No. 883,231, Mar. 3, 1978, abandoned.

[51] Int. Cl.² .......................... B32B 27/00; D02G 3/00

[52] U.S. Cl. .......................... 428/383; 174/110 N; 174/120 SR; 428/380; 428/397

[58] Field of Search .......................... 428/375, 379, 380, 383, 428/458, 474, 480, 397; 174/110 N, 120 SR

[56] References Cited

U.S. PATENT DOCUMENTS

| | | | |
|---|---|---|---|
| 2,216,835 | 10/1940 | Carothers | 174/110 N |
| 2,348,536 | 5/1944 | Gordon | 174/110 N |
| 2,364,204 | 12/1944 | Fuller | 428/397 X |
| 3,312,573 | 4/1967 | Sheffer | 428/383 |
| 3,446,660 | 5/1969 | Pendleton | 428/383 |
| 3,513,252 | 5/1970 | Shoerner | 428/383 X |
| 3,523,820 | 8/1970 | Sheffer | 428/383 X |
| 3,632,440 | 1/1972 | Preston | 260/824 R |
| 3,695,929 | 10/1972 | Sattler | 428/383 |
| 3,842,192 | 10/1974 | Hilker et al. | 174/120 SR |
| 3,843,587 | 10/1974 | Keating et al. | 428/383 |
| 3,975,571 | 8/1976 | Kawaguchi et al. | 428/371 |
| 4,004,063 | 1/1977 | Peterson et al. | 428/383 |
| 4,163,826 | 8/1979 | Kawaguchi et al. | 174/110 N |

FOREIGN PATENT DOCUMENTS 1148401 4/1969 United Kingdom .

OTHER PUBLICATIONS

The Condensed Chemical Dictionary, Eighth Edition, Van Nostrand Reinhold Company, 1971, p. 635.

*Primary Examiner*—Lorraine T. Kendell
*Attorney, Agent, or Firm*—David W. Brownlee

[57] ABSTRACT

A new and improved magnet wire is provided comprising a copper or aluminum conductor, a basecoat consisting of at least one layer of insulating material around and along the length of the conductor and a polyundecaneamide or polydodecaneamide topcoat around and along the length of the basecoat, wherein the topcoat comprises from approximately 5 to 95% of the total coating thickness.

8 Claims, 2 Drawing Figures

WIRE SIZE 18 AWG; COILS 1/4 IN. (6.35mm) HELICES

MAGNET WIRE

This is a continuation of application Ser. No. 883,231, filed Mar. 3, 1978, now abandoned.

BACKGROUND OF THE INVENTION

1. Field of the Invention

The present invention relates to a magnet wire with improved windability and insertability which, in addition, is bondable at elevated temperatures, including the range 185° C. to 200° C. and includes a topcoat around and along the length of a basecoat provided over a conductor, wherein the topcoat is a polyamide selected from the group consisting of polyundecaneamide, polydodecaneamide and mixtures thereof.

2. Description of the Art

An insulated copper or aluminum wire used in the coils of all types of electromagnetic machines, such as windings of motors, solenoids and transformers, is known as magnet wire. The most widely used types of insulation for magnet wire include enamel, natural and synthetic fibers, glass and paper. Depending upon the type of insulation, magnet wire can be classified at temperature indices from 105° C. to 220° C.

The insulation provided on magnet wire often comprises a dual system which includes a basecoat and a topcoat. The basecoat material is usually chosen for its ability to perform certain functions, such as heat stability, solderability and solvent resistance. Common basecoat materials are polyesters and polyurethanes, although epoxies, polyacrylics, polyimides and amide-imide coatings are also used for basecoats. The term basecoat, as used herein, also includes combinations of the aforementioned materials.

Certain nylons, nylon 6,6 (poly-hexamethyleneadipamide) and nylon 6 (polycaprolactam) in particular, have been employed as a topcoat for magnet wire. Because of the low coefficient of friction of 0.17 (dynamic, film-on-film) for nylon 6 and 6,6 films, such insulated wire exhibits increased windability over other conventional topcoats. The use of magnet wire topcoated with nylon 6 or 6,6, however, may pose several problems to the end user.

First, manufacturers of motors and the like often bond the wound wire in place. The most common method of bonding nylon 6 or 6,6 topcoated magnet wire coils is by dipping the entire coil into a varnish bath and baking the varnish on the coil. Such dipping and baking operations are not only time consuming and expensive, but also result in undesirable solvent emissions and fumes that must not be released into the atmosphere. The ideal topcoat would be a self-bonding type, such as polyvinylbutyral coated magnet wire. By heating polyvinylbutyral above approximately 100° C., the coating softens, flows and bonds the windings in place. Polyvinylbutyral overcoated magnet wire is limited to use in low thermal class systems because of its low softening temperature. Magnet wire applications requiring a thermal class rating of at least 130° C. preclude the use of self-bonding polyvinylbutyral. It would not be practical to heat bond nylon 6 or 6,6. Heating nylon 6,6, for example, to its melting temperature of about 250° C. would exceed the thermal resistance of the basecoat and other components of the system, such as slot liners. Furthermore, nylon 6,6 rapidly degrades in air at this temperature.

A second disadvantage of nylon 6 or 6,6 topcoats or films is the fact that such materials absorb water. Water absorption decreases the electrical performance of the wires, but improves film flexibility. However, nylon 6 and especially nylon 6,6 becomes brittle when they lose moisture resulting in decreased windability and increased insulation cracking problems.

Thirdly, although a nylon 6 or 6,6 topcoat typically improves the windability and insertability of magnet wire over other magnet wire insulating materials, winding and inserting problems are still encountered. The coefficient of friction (dynamic, film-on-film) of nylon 6,6 is 0.17. A topcoat material exhibiting a lower coefficient of friction, even an improvement of 0.01, would significantly increase the windability and insertability of the magnet wire. The prior art, such as U.S. Pat. No. 3,632,440, recognizes this advantage and teaches that use of film forming polysiloxane resin in the topcoat will outperform nylon insulation in that the coefficient of friction of such magnet wire measures 0.14. However, in most electrical systems, the presence of silicone is intolerable.

Accordingly, an improved magnet wire is desired that is self-bonding at a temperature that does not harm the basecoat and other system components, is moisture resistant and exhibits improved windability and insertability. Such improvements should not significantly affect the flexibility, abrasion resistance or heat shock resistance of the magnet wire.

SUMMARY OF THE INVENTION

This invention may be summarized as providing an improved magnet wire comprising an aluminum or copper conductor, a basecoat consisting of at least one layer of insulating material around and along the length of the conductor, and a topcoat around and along the length of the basecoat, wherein the topcoat is a polyamide selected from the group consisting of polyundecaneamide, polydodecaneamide and mixtures thereof and wherein the topcoat comprises from approximately 5 to 95% of the total coating thickness.

It has been found that a self-bonding magnet wire could be manufactured by providing a topcoat of nylon 11 (polyundecaneamide), nylon 12 (polydodecaneamide) or mixtures thereof. At the present time, nylon 11, a castor oil derivative, has been used in Europe as a lining for gasoline tanks and the like because of its solvent resistance.

The novel use of nylon 11 and 12 as a topcoat for magnet wire improves the windability and insertability over that of magnet wire having a nylon 6 or 6,6 topcoat. The coefficient of friction (dynamic, film-on-film) of nylon 11 and 12 of 0.14 to 0.16 is lower than that of nylon 6,6. In certain magnet wire applications, such as motor stators and color television yoke coils, a reduction in the coefficient of friction by even as much as 0.01 causes a significant increase in the dimensional precision of coils wound in high-speed winders and in the ease of wire insertion. In general, the coefficient of friction for nylons decreases under increased pressure, as in the case of inserting. However, this decrease in the coefficient of friction is greater for nylon 11 and 12 than for nylon 6 or 6,6 under the same pressure.

Improved insertability allows the same amount of wire to be inserted into a slot or the like with less pressure or, alternatively, allows more wire to be inserted into the same size slot with the same pressure. There are additional advantages to improved, insertability. First, a precision wound coil may be inserted into a motor stator or the like with virtually no deformation of the wires. It follows then that the electrical resistance of coils wound in accordance with the present invention exhibit less variability. This results in a motor that runs quieter and much more efficiently. Further, motors may be constructed to tighter tolerances when the magnet wires are characterized by improved insertability. With nylon 11 and 12 topcoated magnet wire, more turns per coil can be inserted when necessary without redesigning the motors. In addition, an increase in the number of coils inserted simultaneously becomes possible, thereby reducing manufacturing costs.

Another advantage of nylon 11 and 12 is their moisture resistance. Table 1 compares the absorption of water by nylons.

Table 1

| Nylon Type | Water Absorption of Nylon: 24 hr. ASTM D 570 | Equilibrium with 50% R.H. | Equilibrium with 100% R.H. |
|---|---|---|---|
| 6 | 1.60% | 2.7% | 9.5 |
| 6,6 | 1.50 | 2.5 | 8.0 |
| 11 | 0.25 | 0.8 | 1.9–2.9 |
| 12 | 0.25 | 0.7 | 1.4–2.5 est. |

The decreased tendency of nylon 11 or 12 to absorb water yields a specific advantage over nylon 6 or 6,6 when applied to magnet wire. Nylon 11 retains its electrical properties better than 6 or 6,6 in a moisture environment (see Table 2).

Table 2

| Nylon Type | Volume Resistivity of Nylons vs. Relative Humidity: Relative Humidity | Volume Resistivity ASTM D 257 (ohm . cm) |
|---|---|---|
| 6 | Dry | $10^{15}$ |
| | 50% | $10^{13}$ |
| | 100% | $10^{8}$ |
| 6,6 | Dry | $10^{15}$ |
| | 50% | $10^{13}$ |
| | 100% | $10^{9}$ |
| 11 | Dry | $10^{15}$ |
| | 50% | $10^{14}$ |
| | 100% | $10^{13}$ |

The thermal rating of a 20% nylon 11 or 12 overcoated polyester magnet wire is Class 180° C; however, in user applications, it should be considered that this temperature is within the softening range.

When testing the bondstrength of bonded coils, as per NEMA Standards Publication No. MW 1000-1977, Part 3, 57, it was found that helical coils made with the invention had bondstrengths greater than any other thermoplastic bondcoats. Because of the narrow softening range of the overcoat of this invention, this higher bondstrength is retained at temperatures up to the minimum required bonding temperatures.

The overall advantage of the present invention is the provision of a new and improved self-bonding magnet wire that has a lower coefficient of friction than that of other magnet wires, yet is moisture resistant, is not embrittled when dry, is self-bondable at a temperature of approximately 185° to 200° C. and, when used over an appropriate basecoat, has a thermal class rating of Class 180° C. (ASTM D-2307) enabling the magnet wire to be used in practically all conventional applications.

The above advantages of this invention will be more fully understood and appreciated with reference to the following detailed description and the drawings appended hereto.

DESCRIPTION OF THE PREFERRED EMBODIMENTS

Figure 1:
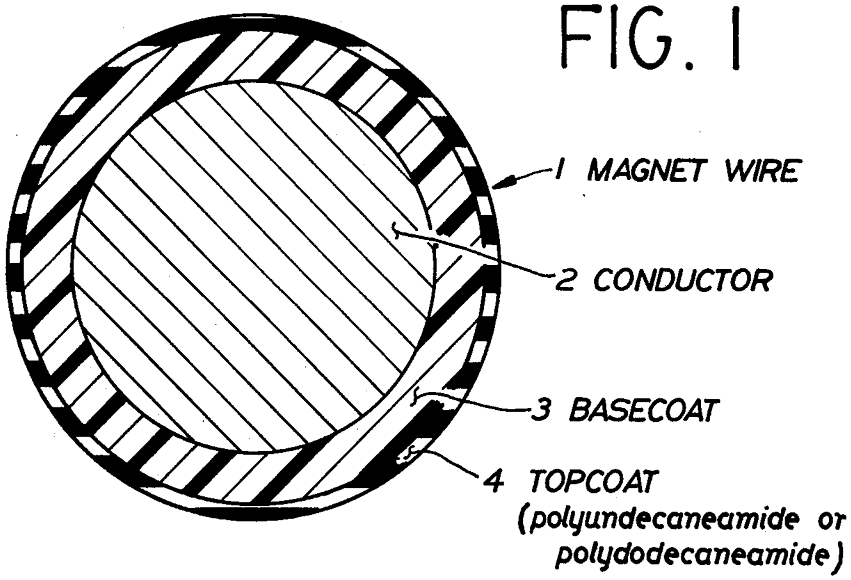
FIG. 1 is a cross-sectional view of a magnet wire coated in accordance with the present invention.

FIG. 1 illustrates a preferred embodiment of a magnet wire of the present invention. The magnet wire 1 includes a centrally located conductor 2, usually a single strand, which is generally circular in cross section. Although the conductor in a magnet wire is usually circular in cross section, it may also be drawn in square, rectangular, ribbon or other shapes.

An insulating basecoat 3 is provided around and along the length of the conductor 2, as shown in FIG. 1. The basecoat of the present invention preferably consists of a modified polyester for high temperature applications which desirably has a thickness of from approximately 0.002 to 0.03 millimeter. However, other basecoat materials are comprehended by the present invention, such as polyvinylformal, polyurethanes and epoxies. Additional basecoat materials include acrylics, polyimides, amide-imides, imidized polyester and amide-imide polyesters. The preferred polyesters include the standard thermal Class 155° C. polyester based on terephthalic acid (or ester), ethylene glycol and glycerol and the thermal Class 180° C. polyester typically based on terephthalic acid, THEIC (tris-hydroxethyl isocyanurate) and glycerol.

Although not illustrated, the basecoat 3 may also comprise a multiple system. For example, the basecoat may include an amide-imide overcoated thermal Class 180° C. THEIC modified polyester or nylon 6,6 overcoated imidized polyester or polyethylene terephthalate overcoated polyester.

The topcoat 4 of the present invention, provided around and along the length of the basecoat, is a polyamide, namely nylon 11, nylon 12 or mixtures thereof. Nylon 11 is polyundecaneamide with the chemical formula:

$$H[HN(CH_2)_{10}CO]_nOH$$

Nylon 11 is made from 11-aminoundecanoic acid. Nylon 12 is polydodecaneamide with the chemical formula:

$$H[HN(CH_2)_{11}CO]_nOH$$

Since nylon 11 and nylon 12 are miscible, a mixture thereof may be utilized as the topcoat of the magnet wire of the present invention. The following table, Table 3, illustrates certain properties of nylon 11 and nylon 12:

Table 3

| Properties of Nylon 11 and Nylon 12: Property | Nylon 11 | Nylon 12 |
|---|---|---|
| Melting Temperature °C. | 185 | 175–180 |
| Coefficient of | | |

Table 3-continued

| Property | Properties of Nylon 11 and Nylon 12 | |
|---|---|---|
| | Nylon 11 | Nylon 12 |
| Friction (Dynamic, film-on-film) | 0.14–0.15 | 0.16 |

The amount of nylon 11 and/or 12 topcoat may vary from 5 to 95% of the total film build on the conductor and may be applied to magnet wire of any size or shape. Preferably the nylon 11 and/or 12 topcoat comprises from approximately 10 to 20% of the total film build. The amount of topcoat may depend on the end use of the magnet wire. For example, nylon 11 has been found to increase the windability and insertability of the magnet wire. On a conductor consisting of a single strand of from No. 16 to No. 25 AWG copper wire, the thickness of the nylon 11 top coat will most preferably be from approximately 0.005 to 0.15 millimeter. If the primary concern was winding and inserting, then a relatively thin (10% of the total film build) topcoat may be desirable in the interests of economy. If the primary concern is the bondability of the magnet wire, then a thicker (20% or more of the total film build) topcoat may be desirable to increase the ultimate bondstrength. Although thin topcoats of nylon 11 and/or nylon 12 are thermally bondable, it has been found that the strength of the bond is increased with the thickness of the topcoat.

The magnet wire of the present invention may be manufactured by any procedure. The following example is merely illustrative. A round bare copper wire with a nominal diameter of 0.0403 inch (1.02 mm) or No. 18 AWG, is used as the conductor. The bare copper wire is provided with a THEIC modified terephthalic polyester basecoat, applied at approximately 35% solids in four coats. Each coat is passed through a conventional curing oven, such as an 18-foot (5.5 meter) oven, maintained at a temperature of from 300° to 450° C., at a speed of approximately 45 feet per minute (13.7 meters per minute). Each successive coat increases the overall diameter of the magnet wire as the wire is passed through coating dies having a diameter of 0.043 inch (1.10 mm), 0.044 inch (1.12 mm), 0.045 inch (1.14 mm) and 0.046 inch (1.17 mm), respectively. After curing, the polyester basecoat increased the diameter of the wire a total of 0.002 inch (0.05 mm) to 0.0423 inch (1.07 mm).

A topcoat of nylon 11 or nylon 12 is applied to the coated wire by first dissolving the nylon at approximately 20% solids (by weight) in cresylic acid, comprising a mixture of phenol, cresol and xylenol, at a temperature of approximately 100° to 120° C. This dissolved mixture is diluted with an aromatic hydrocarbon, such as xylene, to approximately 15% solids. The resulting solution contains approximately three parts cresylic acid to one part aromatic hydrocarbon and has a viscosity of approximately three to seven pascal seconds at 25° C. This solution is applied to the basecoated magnet wire preferably in two coats. Each of the two coats is applied by passing the magnet wire through coating dies, each having a diameter of 0.047 inch (1.195 mm). The wire is cured through the oven mentioned above, after which the diameter of the wire is increased a total of 0.0007 inch (0.02 mm) to 0.0430 inch (1.09 mm). A 25 to 30% nylon 11 and/or 12 topcoat build can typically be applied smoothly onto No. 18 AWG wire in two coats. The total nylon topcoat film build of the magnet wire of the present example comprises approximately 25% of the total coating thickness.

The nylon 11 or nylon 12 topcoat may be applied to the magnet wire by conventional methods. Alternatively, the topcoat may be applied by more recently developed methods, such as extruding and powder coating, or the topcoat may be fused onto the wire by such alternative methods as microwave, induction heating or laser, to melt the nylon and cause it to flow smoothly around the wire.

The magnet wire of the present invention is characterized by improved windability and insertability because of its low coefficient of friction. As is conventional, a dry lubricant, such as paraffin, may be applied over the magnet wire to aid lubricity even further. Thus, the magnet wire of the present invention is able to withstand the stress of high speed precision winding machinery, such as that used in winding color television yoke coils. Such magnet wire sufficiently resists abrasion and heat shock in such application. A significant added advantage of the present invention is that the magnet wire is thermally bondable, i.e. is bondable in an oven or by resistance heating or the like at a nondetrimentally low temperature of approximately 180° to 200° C.

Nylon 11 and/or nylon 12 serves as an excellent thermal adhesive for coiled magnet wire by heating the coil at least to the melting temperature of the topcoat material, which is 185° C. for nylon 11 and 175° C. for nylon 12. The temperature to which the nylon topcoat is exposed must not be high enough to degrade the magnet wire. For all practical applications, heating of the coil to a temperature of 190° to 200° C. will effectively bond the coiled magnet wires of the present invention.

Previously a yoke coil was bonded by dip coating the entire yoke into an activating bonding solvent. Alternatively, a varnish coating would have to be applied over the coil by an auxiliary operation. By using the magnet wire of the present invention, however, a yoke coil may be simply resistance heated to bond the coil. The bondstrength is adequate for the coil to retain the bonded configuration while in use at elevated temperatures, such as that experienced in the operation of a color television set.

Figure 2:
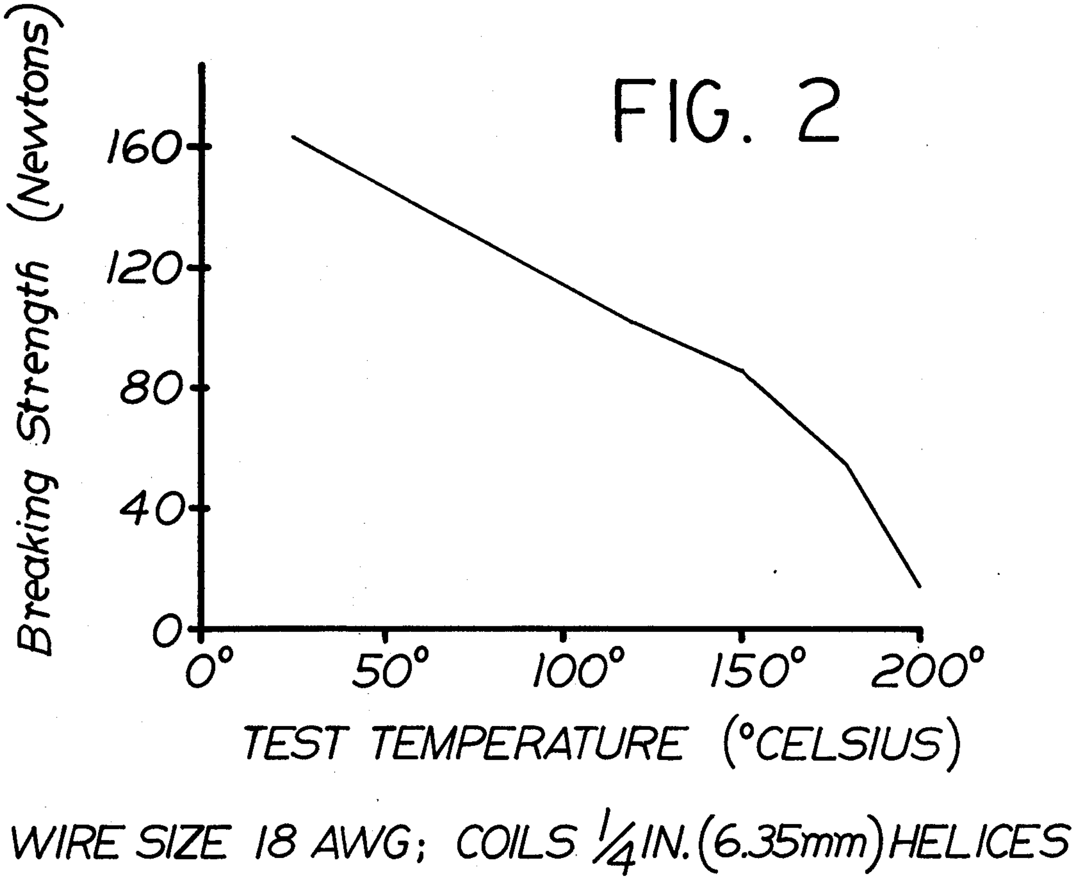
FIG. 2 is a graph illustrating the bondstrength of a coil of magnet wire of the present invention at various temperatures.

For bondstrength testing purposes, per ASTM D 2519, the above-described magnet wire of the present invention was wound into helical coils. The coils were then bonded by resistance heating to approximately 200° C. After cooling to room temperature, the coils were tested for bondstrength. Room temperature bondstrength for No. 18 AWG is 133 to 178 newtons. Bondstrength retention at elevated temperatures is illustrated in FIG. 2. The coils used to obtain the results illustrated in FIG. 2 were constructed and tested as per NEMA Standards Publication No. MW 1000-1977, Part, 3, 57, and the coils were bonded at 200° C. It is important to note that the magnet wire of the present invention retains more than 50% of its room temperature bondstrength when heated to 150° C.

What is believed to be the best mode of the present invention has been described above. It will be apparent to those skilled in the art that numerous variations of the illustrated details may be made without departing from this invention.

What is claimed is:

1. A magnet wire comprising a conductor wherein the conductor is a metal selected from the group consisting of copper, aluminum and aluminum alloy;

a completely organic thermosetting basecoat adjacent the conductor consisting of at least one layer of insulating material around and along the length of the conductor; and a self-bondable topcoat adjacent to and around and along the length of the basecoat wherein the topcoat is a polyamide selected from the group consisting of polyundecaneamide, polydodecaneamide and mixtures thereof, and wherein the topcoat comprises from 5 to 95% of the total coating thickness.

2. A wire as set forth in claim 1 wherein the conductor is generally round in cross section.

3. A wire as set forth in claim 1 wherein the conductor is generally rectangular in cross section.

4. A magnet wire bondable at an elevated temperature in the range of approximately 190° to 200° C. comprising a conductor consisting of a single strand of wire wherein the wire is a metal selected from the group consisting of copper, aluminum and aluminum alloy;

a thermosetting modified polyester insulating basecoat adjacent to and around and along the length of the conductor;

a self-bondable topcoat adjacent to and around and along the length of the polyester basecoat wherein the topcoat is a polyamide selected from the group consisting of polyundecaneamide, polydodecaneamide and mixtures thereof, and wherein the topcoat comprises approximately 10 to 20% of the total coating thickness; and a dry lubricant over the topcoat.

5. A magnet wire bondable at a temperature of approximately 190° to 200° C. and having a thermal heat life of at least 20,000 hours at 155° C., comprising a conductor consisting of a single strand of wire wherein the wire is a metal selected from the group consisting of copper, aluminum and aluminum alloy;

a thermosetting modified polyester insulating basecoat adjacent to and around and along the length of the conductor; and a self-bondable polyundecaneamide topcoat adjacent to and around and along the length of the polyester basecoat, and wherein the topcoat comprises approximately 10 to 20% of the total coating thickness.

6. A magnet wire bondable at a temperature of approximately 190° to 200° C. comprising a conductor consisting of a single strand of from No. 14 to No. 35 AWG wire;

a thermosetting modified polyester, insulating basecoat adjacent to and around and along the length of the conductor having a relatively uniform film thickness of from approximatley 60% to 90% of the total coating thickness; and a self-bondable topcoat adjacent to and around and along the length of the basecoat, wherein the topcoat is a polyamide selected from the group consisting of polyundecaneamide, polydodecaneamide and mixtures thereof, having a relatively uniform film thickness of from approximately 10% to 40% of the total coating thickness.

7. A magnet wire bondable at a temperature of approximately 190° to 200° C. with a resulting bond-strength of at least 89 newtons at a temperature of 150° C., having a thermal heat life of at least 20,000 hours at 155° C., and characterized by a dynamic, film against film, coefficient of friction of from 0.14 to 0.16, comprising a conductor consisting of a single strand of from No. 14 to No. 35 AWG wire;

a thermosetting modified polyester, insulating basecoat adjacent to and around and along the length of the conductor having a relatively uniform film thickness of from approximately 60% to 90% of the total coating thickness; and a self-bondable polyundecaneamide topcoat adjacent to and around and along the length of the basecoat, having a relatively uniform film thickness of from approximately 0.005 to 0.015 millimeter.

8. A magnet wire bondable at a temperature of approximately 190° to 200° C. with a resulting bond-strength of at least 89 newtons at a temperature of 150° C., comprising a conductor consisting of a single strand of from No. 16 to No. 25 AWG copper wire;

a thermosetting modified polyester, insulating basecoat adjacent to and around and along the length of the conductor having a relatively uniform film thickness of from approximately 0.02 to 0.03 millimeter; and a self-bondable polyundecaneamide topcoat adjacent to and around and along the length of the basecoat, having a relatively uniform film thickness of from approximately 0.005 to 0.015 millimeter.

* * * * *